United States Patent
Watabe (10) Patent No.: US 7,245,208 B2
(45) Date of Patent: Jul. 17, 2007

(54) TIRE CONDITION DETECTING SYSTEM AND METHOD

(75) Inventor: Nobuya Watabe, Nagoya (JP)

(73) Assignee: DENSO Corporation, Kariya (JP)

( * ) Notice: Subject to any disclaimer, the term of this patent is extended or adjusted under 35 U.S.C. 154(b) by 185 days.

(21) Appl. No.: 11/188,861

(22) Filed: Jul. 26, 2005

(65) Prior Publication Data

US 2006/0055518 A1  Mar. 16, 2006

(30) Foreign Application Priority Data

Sep. 10, 2004  (JP) ............................. 2004-263754

(51) Int. Cl.
*B60C 23/00* (2006.01)

(52) U.S. Cl. ...................... 340/442; 340/445; 340/446; 340/447; 340/448; 340/438; 73/146.5; 73/721; 73/724

(58) Field of Classification Search ................ 340/442, 340/445, 446, 447, 448, 438; 73/146.5, 721, 73/724

See application file for complete search history.

(56) References Cited

U.S. PATENT DOCUMENTS

| | | | |
|---|---|---|---|
| 6,518,877 B1 * | 2/2003 | Starkey et al. | ............... 340/447 |
| 2004/0066288 A1 * | 4/2004 | Okumura | ..................... 340/445 |
| 2004/0193340 A1 | 9/2004 | Katou | |
| 2005/0253697 A1 * | 11/2005 | Taguchi | ...................... 340/447 |

FOREIGN PATENT DOCUMENTS

JP    A-2000-255229    9/2000

* cited by examiner

*Primary Examiner*—Tai Nguyen
(74) *Attorney, Agent, or Firm*—Posz Law Group, PLC (57) ABSTRACT

A tire condition detecting system has transmitters and a receiver. The transmitter is installed in a plurality of wheels and the receiver is installed in a chassis of a vehicle. The receiver has a controller which determines transmission timings in which a transmitting/receiving unit transmits the electrical wave for electrical charging to the transmitters. Moreover the controller detects an electrical wave from a nearby vehicle at the transmission timing. If the detected wave from the nearby vehicle is stronger, the controller waits for a predetermined period before making the transmitting/receiving unit transmit the electrical wave.

5 Claims, 5 Drawing Sheets

TIRE CONDITION DETECTING SYSTEM AND METHOD

CROSS REFERENCE TO RELATED APPLICATION

This application is based on and incorporates herein by reference Japanese Patent Application No. 2004-263754 filed on Sep. 10, 2004.

FIELD OF THE INVENTION

The present invention relates to a tire condition detecting system and method having a transmitter and a receiver and detecting tire condition such as air pressure of a tire, wherein the transmitter is directly installed in a wheel having the tire. The transmitter may includes a pressure sensing unit and transmits a detection signal which the pressure sensing unit outputs. The receiver is installed in a chassis of a vehicle and receives the detection signal from the transmitter.

BACKGROUND OF THE INVENTION

In conventional tire air pressure detecting systems a direct-type tire air pressure detecting systems has a transmitter, which is installed in a wheel having a tire and has a sensing unit such as a pressure sensor. The detector also has a receiver which has an antenna and is installed in a chassis of a vehicle. When the transmitter transmits a radio wave including a detection signal received from the sensing unit, the receiver receives the wave by means of the antenna. Thus, air pressure of the tire is detected.

As such a tire air pressure detecting system, a batteryless direct-type tire air pressure detecting system is desired. In this system, a transmitter does not have a battery for transmission and is electrically charged by a transponder method, which is widely known (JP 2000-255229A). In such a system using transponder method, an onboard receiver transmits an electrical wave for electrical charging (hereafter charging wave) through an onboard antenna and a capacitor installed in the transmitter is charged by the charging wave. When the capacitor stores sufficient electrical power, the transmitter transmits a detection signal.

Figure 8:
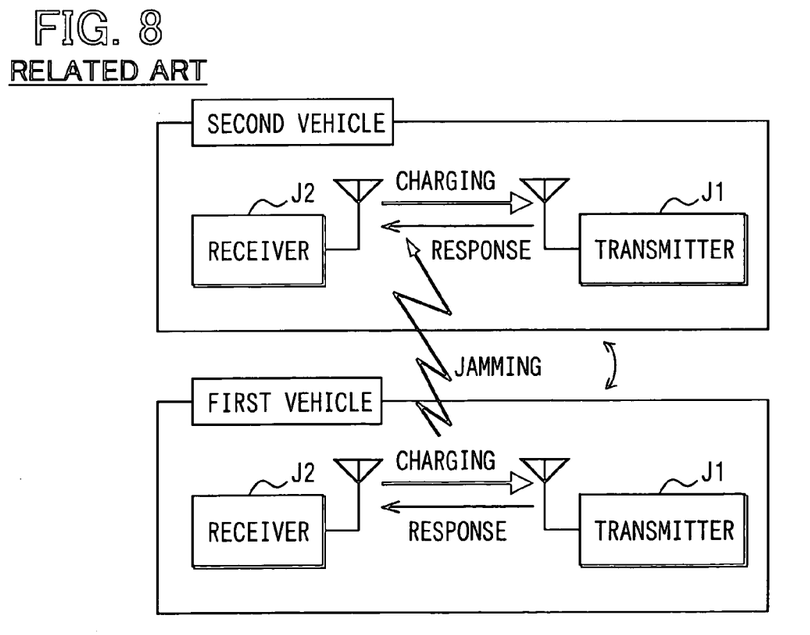
FIG. 8 shows jamming of a response frame of a vehicle caused by transmission of a charging wave by another vehicle.

In the batteryless tire air pressure detecting system, the power of the electrical charging wave is strong, while the power of the wave including the detection signal (hereafter response wave) from the transmitter to the receiver is weak. It is assumed here that two vehicles have the same batteryless tire air pressure detecting systems and come close to each other as shown in FIG. 8. In this situation, if a receiver J2 in one of the vehicles (hereafter the first vehicle) transmits a charging wave while a transmitter J1 in the other vehicle (hereafter the second vehicle) is transmitting a response wave, the response wave is jammed by the charging wave.

The transmission between the transmitter and the receiver may get frequent, because the batteryless tire air pressure detecting system does not have to save the consumption of battery and there may be a need of the frequent transmission in order to control the vehicle according to the detected tire air pressure. In this case it becomes necessary to find a solution to the problem.

SUMMARY OF THE INVENTION

The present invention addresses the above point. Thus, it is an objective of the present invention to provide a tire condition detecting system and method which hardly causes the above problem.

According to a tire condition detecting system and method, a transmitter is installed in a wheel of a first vehicle and the receiver is installed in a chassis of the first vehicle. The receiver determines transmission timing at which it transmits the electrical wave for electrical charging to the transmitter. The receiver detects an electrical wave for electrical charging from a second vehicle at the transmission timings. If the intensity of the detected wave from the second vehicle is larger than a predetermined threshold, the second controller waits for a first predetermined period before making the second transmitting/receiving unit transmit the electrical wave for electrical charging.

Thus, the tire condition detecting system executes carrier sensing before charging, to detect the electrical wave for electrical charging, and thereby checks if the second vehicle is transmitting a charging wave from a nearby position.

Therefore, when the second vehicle is transmitting a charging wave from the nearby position, the transmitter of the first vehicle is prohibited from transmitting the detection signal to avoid communication trouble in which the receiver cannot receive the detection signal.

BRIEF DESCRIPTION OF THE DRAWINGS

The invention, together with additional objective, features and advantages thereof will be best understood from the following description, the appended claims and the accompanying drawings. In the drawings:

DETAILED DESCRIPTION OF THE PREFERRED EMBODIMENT

First Embodiment

Figure 1:
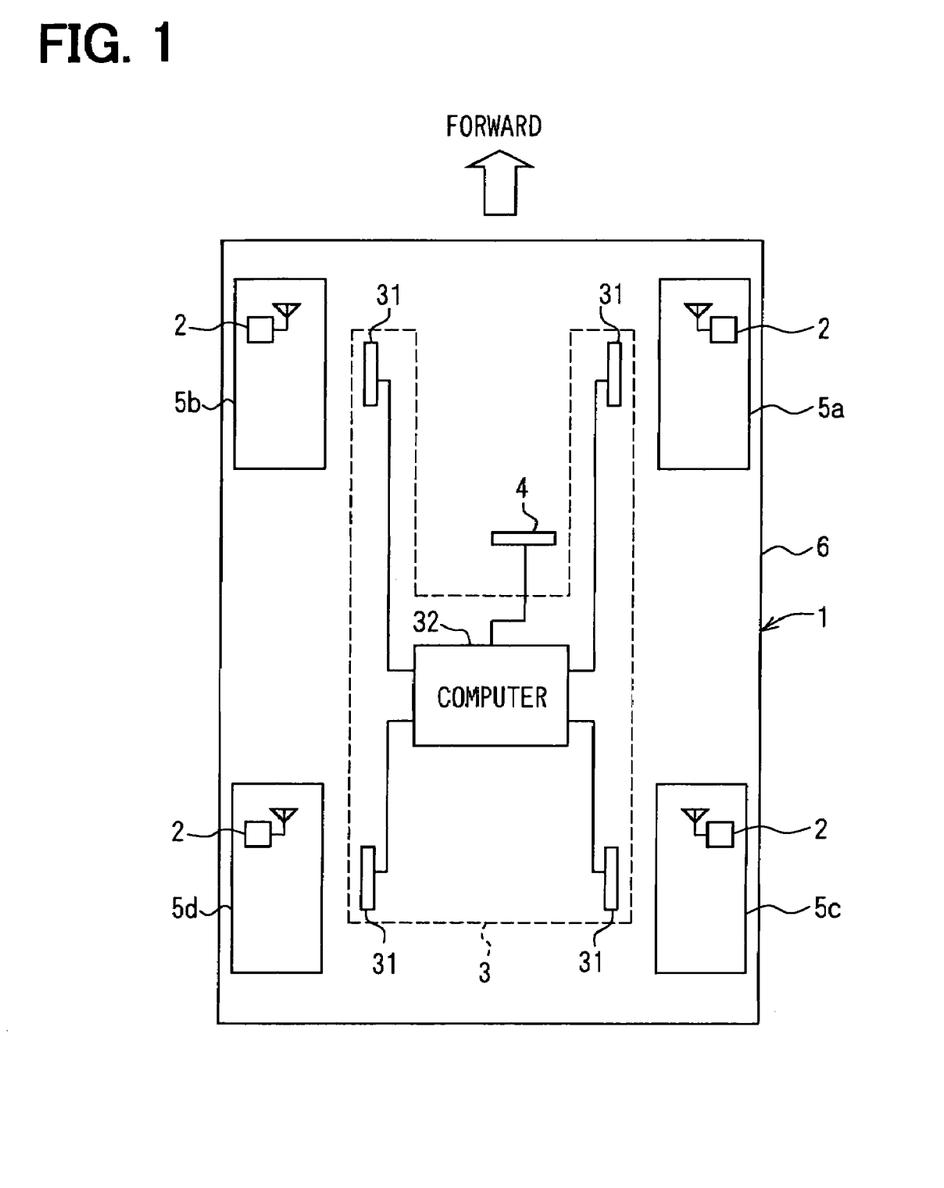
FIG. 1 shows a block diagram of a tire air pressure detecting system in the first embodiment of the present invention.

As shown in FIG. 1, a tire air pressure detecting system is installed as a tire condition detecting system in a vehicle 1 and has transmitters 2, a receiver 3 and a warning unit 4.

Figure 2A:
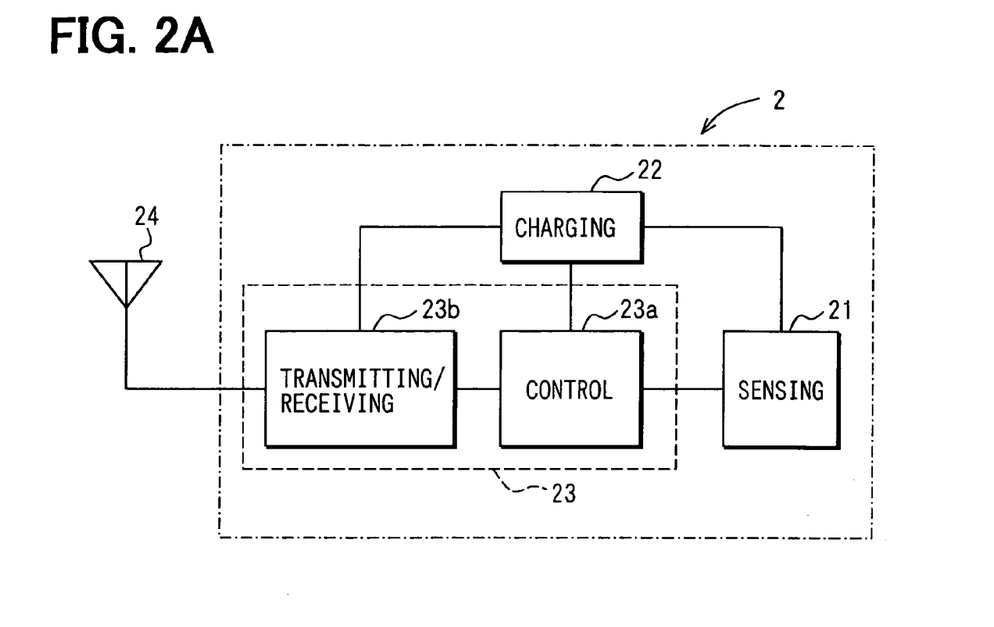
FIG. 2A shows a block diagram of a transmitter.
Figure 2B:
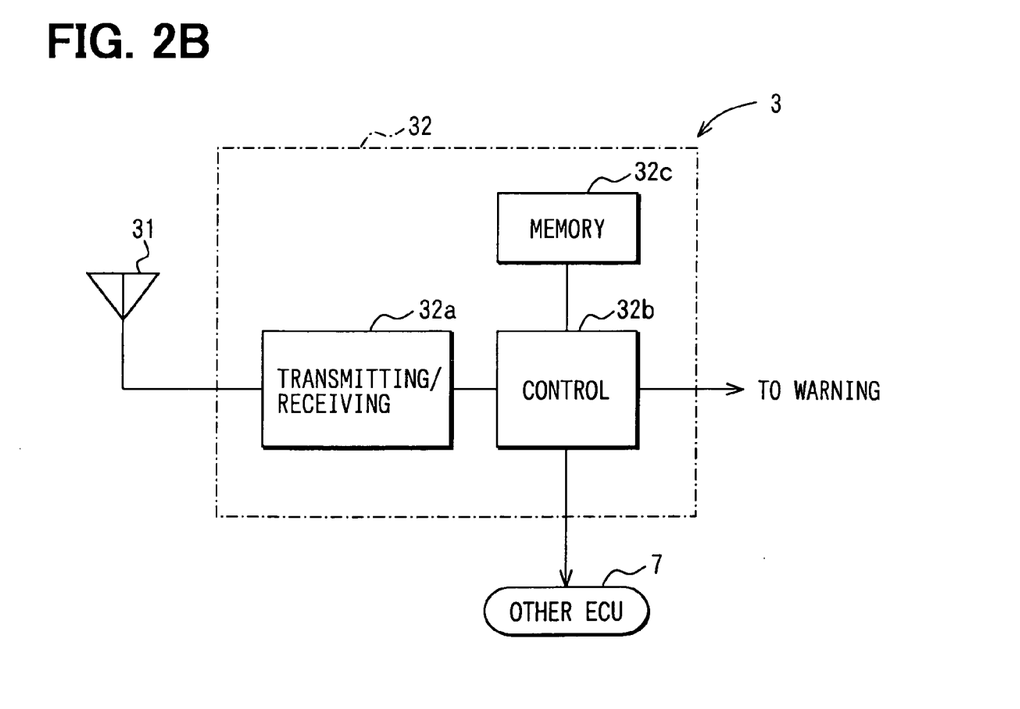
FIG. 2B shows a block diagram of a receiver.

The transmitters 2 are installed in wheels 5a-5d of the vehicle 1. Each transmitter 2 is attached to an air injection valve in a wheel disk of the corresponding wheel 5a-5d. The transmitter 2 detects pneumatic air pressure of a tire of the corresponding wheel 5a-5d, puts detected parameters indicating the detected pressure into a response frame, and transmits the response frame. The receiver 3 is installed in a chassis 6 of the vehicle 1 and transmits an electrical wave for electrical charging (hereafter charging wave) to the transmitters 2. Moreover, the receiver 3 receives the response frames from the transmitters 2 and executes various processes and calculations using the detected parameters in the response frames to obtain air pressure of the tires. Specifically, the receiver 3 has four antennas 31 and a computer device 32. FIGS. 2A and 2B show block diagrams for the structures of the transmitters 2 and the receiver 3, respectively.

Each transmitter 2 charges by means of the charging wave from the receiver 3 and is operated with the charged power. Specifically, each transmitter 2 has a sensing unit 21, a charging unit 22, a computer device 23, and an antenna 24 as shown in FIG. 2A. The transmitter 2 operates by receiving the charging wave through the antenna 24, converting the wave into electrical power and storing the electrical power into the charging unit 22. This transponder method in electrical charging is widely known.

The sensing unit 21 is exposed to the inner space of the corresponding tire. The sensing unit 21 includes for example a diaphragm type pressure sensor and outputs a detection signal indicating the tire air pressure at a time.

The charging unit 22 stores electrical power in the charging wave received through the antenna 24 and supplies the electrical power to the sensing unit 21 and computer device 23.

The computer device 23 has a controller 23a and a transmitting/receiving unit 23b. The controller 23a has a CPU, a ROM, a RAM and an input/output circuit. The CPU executes predetermined processes according to a program stored in the ROM. The controller 23a corresponds to a first controller.

Specifically the controller 23a receives the detection signal from the sensing unit 21, processes the signal and stores the resultant parameters and a wheel ID in the response frame. The wheel ID is an identifier to distinguish a wheel from other wheels. Then the controller 23a transmits the response frame to the receiver 3 through the transmitting/receiving unit 23b. The processes for transmitting the frame to the receiver 3 are executed according to the program, triggered when the transmission of the charging wave stops or when the charging unit 22 stores sufficient power to transmit the response frame. For example, the controller 23a monitors the charging wave from the receiver 3 and executes the process for transmitting the frame on sensing a down edge of the monitored signal, which appears when the transmission of the charging wave stops.

The transmitting/receiving unit 23b not only receives the charging wave and outputs them to the charging unit 22 and the controller 23a, but also transmits the response frame received from the controller 23a to the receiver 3.

Thus, the transmitters 2 detect the air pressure of the corresponding tires and transmit the response frames through the corresponding antenna 24 at the predetermined timings.

The receiver 3 adjusts timings of the charging and makes the transmitters 2 charge at the timings, so that the transmitters 2 transmit the response frame at the predefined timings. In addition, the receiver 3 detects air pressure of the tires based on response frames transmitted by the transmitters at the timings.

The number of the antennas 31 is the same as the number of the tires, that is, the number of the transmitters 2. Each antenna 31 is located at a position related to one of the transmitters 2 in one-to-one correspondence. For example, each antenna 31 is fixed at a predetermined distance to the corresponding transmitter 2. The antenna 31 is duplex antennas, which transmits the charging wave, receives the response frames, and receive a charging wave from other vehicles. However, the antenna 31 may have an antenna dedicated for transmitting and an antenna dedicated for receiving, separately.

The computer device 32 has a transmitting/receiving unit 32a, a controller 32b, and a memory 32c having a non-volatile EEPROM, as shown in FIG. 2B. The controller 32b has a CPU, a ROM, a RAM, an input/output, and a counter. The CPU executes predetermined processes in accordance with a program stored in the ROM. The controller 32b corresponds to a second controller.

The transmitting/receiving unit 32a outputs through the antenna 31 the charging wave which was received from the controller 32b, and receives the response frames from the transmitters 2 and sends the frames to the controller 32b. In the embodiment, the transmitting/receiving unit 32a also receives a charging wave from another vehicle and sending the intensity of the charging wave (hereafter received wave intensity) to controller 32b. The received wave intensity indicates an analog voltage value which expresses magnitude of reception level of a signal obtained by rectifying and detecting the received charging wave. For example, the received wave intensity is obtained from an RSSI port of an IC for receiving waves with frequency over several hundreds MHz.

The controller 32b determines the timings of charging of each transmitter 2 based on charge timing determination processes described below, and transmits the charging wave at the determined timings to make the corresponding transmitter 2 charge. Moreover, at the timings at which the transmitter 2 transmits a response frame, the controller 32b stops transmitting the charging wave and waits for the transmission of the response frame. If the transmitter 2 is designed to transmit the frame triggered by the stop of the transmission of the charging wave, the controller 32b stops the transmission of the charging wave in time with the timings of transmission of the frame. In addition, the controller 32b receives the response frame from transmitting/receiving unit 32a and specifies a wheel in which a corresponding transmitter 2 transmitted the received frame among the wheels 5a-5d according to an wheel ID stored in the frame.

In addition, the controller 32b executes various signal processing and calculations according to the detected parameters in the received frame to obtain the tire air pressure of the wheels 5a-5d and to output an electric signal depending on the obtained pressure to the warning unit 4.

Specifically, the controller 32b makes a decision as to whether the tire air pressure is below a predetermined threshold. Based on the decision of YES (low pressure), it outputs a signal indicating the reduction of the tire air pressure to the warning unit 4.

Moreover, the controller 32b sends various parameters related to the obtained tire air pressure to other ECUs 7 which execute other vehicle controls through an in-vehicle LAN such as a CAN. The ECUs may include a brake ECU or an engine ECU and act as vehicle controllers. The parameters may indicate tire air pressure itself or tire air temperature. In addition, the controller 32b may receive a signal requesting for parameters related to tire air pressure and return the parameters based on the reception. Therefore, the ECUs 7 can executes vehicle control such as brake control and engine control based on the parameters received from the controller 32b. Thus, a vehicle control device is constructed by the tire air pressure detecting system, the ECUs 7, actuators driven by the ECUs 7, and so on. The actuators which are not illustrated may be a brake device or an engine control mechanism. Then the vehicle control device executes the bake control and the engine control depending on the tire air pressure detected by the tire air pressure detecting system.

The memory 32c stores various results of the calculations of the controller 32b and the detected tire air pressures, by relating each of them to one of the wheels 5a-5d.

The warning unit 4 is located at a position where the driver can look at it and has at least one of a warning lump, a warning display, and a warning buzzer, each of which is located in the instrument panel of the vehicle 1. When the warning unit 4 receives a signal indicating reduction of the tire air pressure from the controller 32b of the receiver 3, it gives a warning message accordingly to notify the driver of the reduction.

Next, the operation of the tire air pressure detecting system constructed as above will be described.

First, the receiver 3 transmits a charging wave to the transmitter 2 through the corresponding antenna 31 at the timing of the transmission. The timing of the transmission (hereafter charge timing) is determined by executing charge timing setting processes described later.

Then, the corresponding transmitter 2 receives the charging wave and the charging unit 22 stores the electrical power. When the charging unit 22 stores sufficient electrical power, the computer device 23 puts a result of pressure detection by the sensing unit 21 into the response frame and transmits the resultant frame to the receiver 3. The charging unit 22 may be regarded to have stored sufficient electrical power when voltage of the capacitor reaches predetermined charging voltage.

When the receiver 3 receives the response frame from the transmitter 2, the controller 32b calculates tire air pressure according to the result of the detection in the received frame. Then the controller 32b stores parameters relating to the tire air pressure including the calculated pressure into the memory 32c. Moreover, the controller 32b makes a decision as to whether the calculated pressure is below the predetermined threshold, and based on the decision of yes, outputs the signal indicating the degradation to the warning unit 4.

Moreover, the controller 32b sends parameters related to tire air pressure to the ECUs 7 every time it calculates the pressure or every time it receives a signal requesting for the pressure from the ECUs 7. Thus, the ECUs 7 become able to execute most appropriate brake control or engine control according to the tire air pressure.

Figure 3:
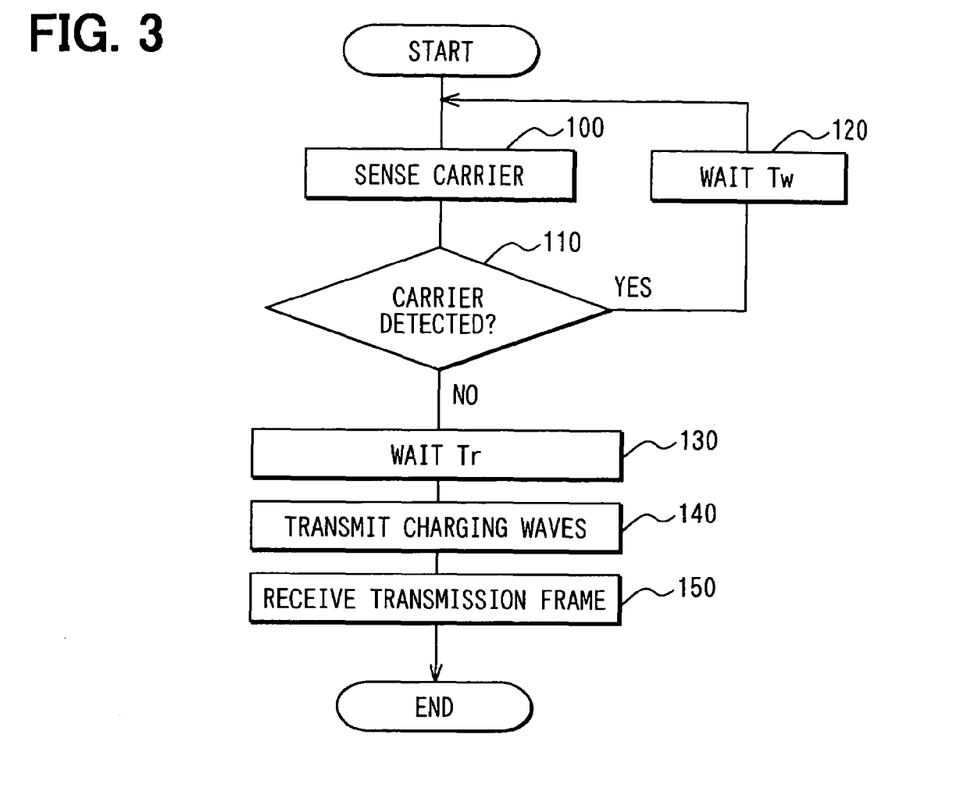
FIG. 3 shows a flowchart of charge timing determination processes which the receiver executes.

Next, the charge timing determination processes will be described in detail. The controller 32b executes the processes every time a timing of transmission of a charging wave comes. The timing of transmission comes for example periodically. In executing the processes, the controller 32b utilize a signal indicating intensity of a charging wave from another vehicle.

Specifically, as shown in FIG. 3, at step 100, the controller 32b executes carrier sensing. The carrier sensing is made by detecting a charging wave from other vehicles before making the transmitters 2 charge, based on intensity of a charging wave the controller 32b received.

Subsequently at step 110, the controller 32b makes a decision as to whether a carrier of a charging wave is detected. This process confirms whether another vehicle is transmitting a charging wave from a distance such that the vehicle 1 suffers from the charging wave. Specifically, the controller 32b makes the decision by comparing the intensity of the received charging wave with a reference level (i.e. threshold). The reference level is set based on the reception level of a response frame from the transmitters 2, that is, the reception level of a response wave. Specifically, the reference level is set so that the receiver 3 becomes unable to receive the response wave due to the received charging wave only if the reception level of the charging wave is more than the reference level. If the reference level is lower than the intensity of the charging wave which is indicated by the signal received by the controller 32b, the controller 32b determines that the carrier is detected.

If the decision is YES at step 110, that is, if another vehicle is transmitting a charging wave from a distance such that the vehicle 1 suffers from the charging wave, the controller 32b executes step 120. At step 120, it waits for a first predetermined period Tw before transmission of a charging wave.

Hereafter, the first predetermined time Tw will be described, on the basis that another vehicle (hereafter a second vehicle) has a tire air pressure detecting system which makes a communication in the same manner as the tire air pressure detecting system of the vehicle 1.

Figure 4:
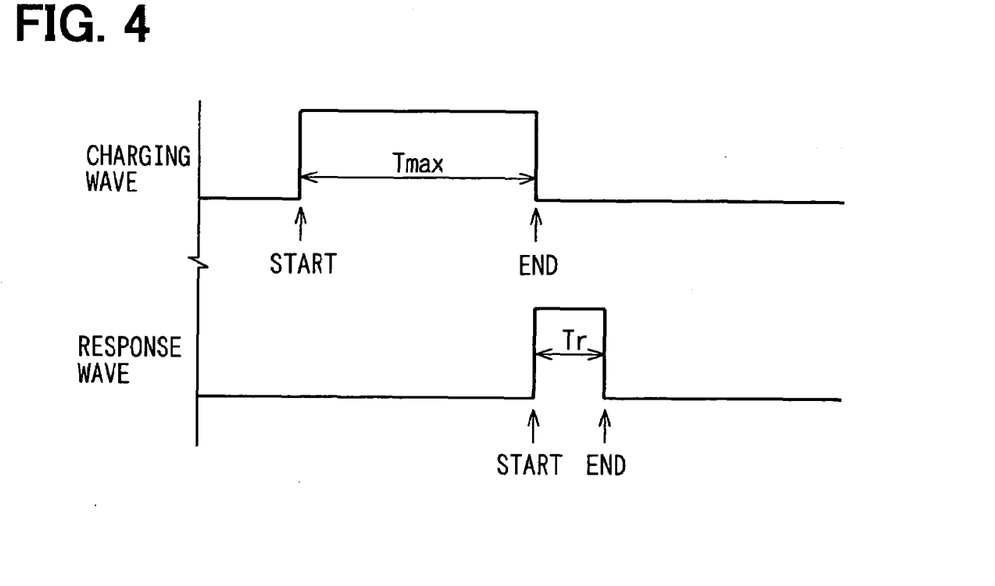
FIG. 4 shows a timing chart which illustrates a relation between maximum charge time and response time.
Figure 5:
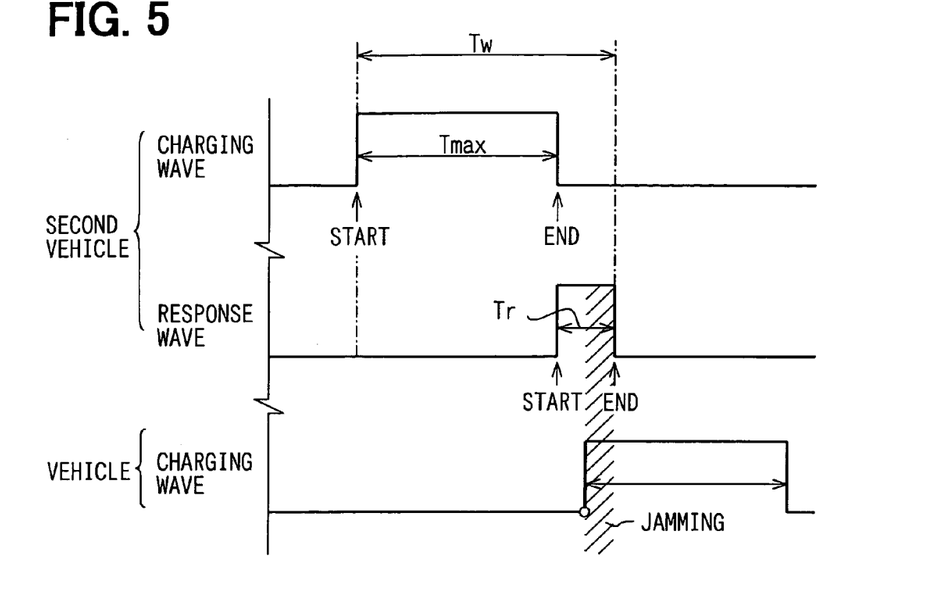
FIG. 5 shows a timing chart which illustrates effects of a charging wave from the a second vehicle, in which the charging wave is transmitted for the maximum charge time and response frames are transmitted for response time.

FIG. 4 shows a relation between a maximum charge time Tmax and a response time Tr. The maximum charge time is a time to take to store necessary electrical power for transmission of a response frame. The response time Tr is a period of transmission needed to transmit a response frame. FIG. 5 shows a timing chart which illustrates effects of the charging wave from the vehicle 1 on the second vehicle, in which the charging wave is transmitted for the maximum charge time Tmax and response frames are transmitted for response time Tr.

As seen in FIG. 4, it takes the maximum charge time Tmax from the start of charging to the end of the charging. In addition, it takes the response time Tr from the end of the charging to the end of transmitting a response frame. Thus it takes the sum Tmax+Tr of the time Tmax and the time Tr to complete a series of charging and responding.

In this case, the second vehicle should have finished charging at a timing where the time Tmax has passed after the receiver 3 of the vehicle 1 detected a carrier. Therefore after the timing, even if the transmitter 2 of the vehicle 1 transmits a charging wave, the receiver 3 will not suffer from the charging wave from the second vehicle and will surely receive a response frame.

However, when the charging of the second vehicle finishes, then the transmitter of the second vehicle transmits a response frame. Therefore, if the receiver 3 of the vehicle 1 transmits a charging wave at that time, the receiver of the second vehicle will become unable to receive the frame due to the charging wave.

To cope with the problem, the controller 32b sets the sum of Tmax and Tr (i.e. Tmax+Tr) as the first predetermined time Tw and waits until the first predetermined time Tw passes before the transmission of charging wave from the receiver 3 of the vehicle 1.

If the decision of step 120 is NO, the controller 32b executes to step 130 and waits for the response time Tr. Even if it is confirmed by the carrier sensing that another vehicle is not transmitting a charging wave from a distance such that the vehicle 1 suffers from the charging wave, there is possibility of another vehicle transmitting a response frame. Thus, the delay Tr, which is necessary for the transmitter of another vehicle to transmit a response frame, will prevent a receiver of another vehicle from failing to receive the response frame due to the charging wave from the vehicle 1.

Next, the controller 32b proceeds to step 140 and makes the transmitter 2 charge. At this time, a charging wave is transmitted to the transmitter 2 through the antenna 31 of the receiver 3. Then, the controller 32b stops transmitting the charging wave for example at a predetermined transmission timing.

Subsequently, the transmitter 2 transmits a response frame triggered by the stop of the charging wave, and the controller 32b receives the response frame and detects tire air pressure according to the parameters which are stored in the frame and are related to the tire air pressure.

As described above, the tire air pressure detecting system in the embodiment executes carrier sensing before charging, and checks if another vehicle is transmitting a charging wave from a distance such that the vehicle 1 suffers from the charging wave.

Therefore, when another vehicle is transmitting a charging wave from such a nearby location that the vehicle 1 suffers from the charging wave, it becomes able to prohibit the transmitter 2 from transmitting a response frame and thus to avoid communication trouble in which the receiver 3 cannot receive the response frame.

In addition, the transmitter 2 charges at timings other than timings in which a transmitter in another vehicle is possibly transmitting a response frame.

Therefore, it becomes possible to avoid communication trouble in which a receiver in another vehicle cannot receive the response frame due to the charging wave from the vehicle 1.

Figure 6:
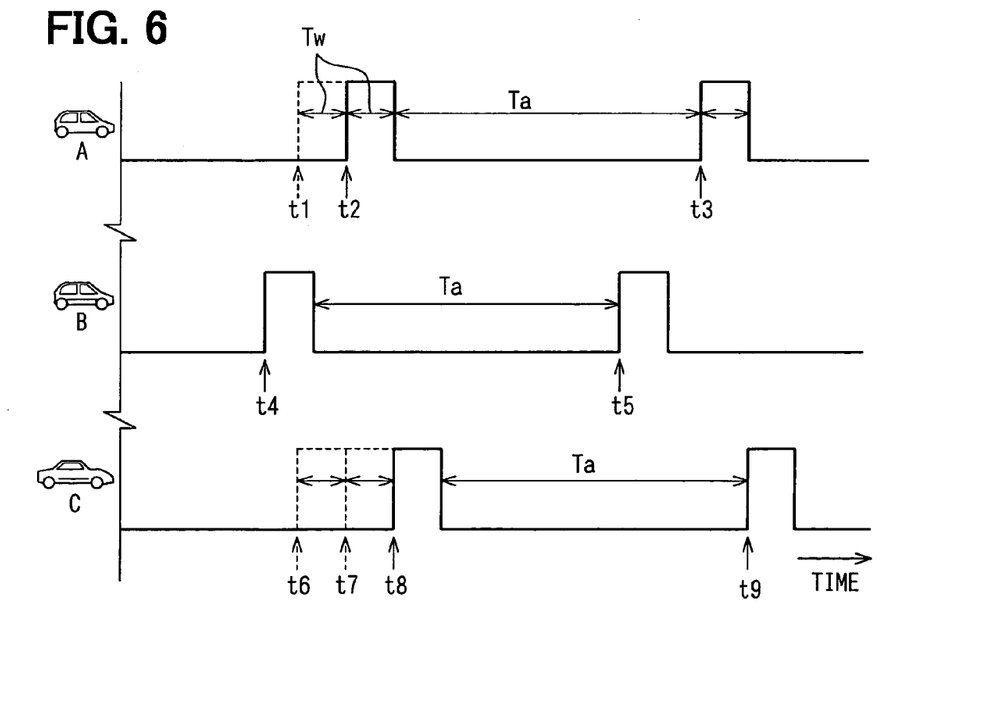
FIG. 6 shows a timing chart of charging and transmission of a response frame in a case where vehicles A-C are moving so close together that vehicles cause trouble in communication each other.

FIG. 6 shows a timing chart of charging and transmission of a response frame in a case where three vehicles A-C are moving so close together that the vehicles cause communication trouble one another.

It is suppose that the vehicle B is originally designed to transmit charging waves and a response frame at a timing t4 and the vehicle A is originally designed to transmit a charging wave and a response frame at a timing t1, which is within a period Tw of the transmission of the vehicle B. Then, at the timing t1, the tire air pressure detecting system of the vehicle A waits for the time Tw before its transmission of the charging wave. As a result, the vehicle A starts charging at a timing t2 in which the transmission of the vehicle B has been completed.

It is further supposed that the vehicle C is originally designed to transmit a charging wave and a response frame at a timing t6, which is within the period Tw of the transmission of the vehicle B starting from the timing t1. Then the tire air pressure detecting system of the vehicle C waits for the time Tw before its transmission of the charging wave. Then, if a timing t7 after the delay is within the period Tw of the transmission of the vehicle A starting from the timing t2, the tire air pressure detecting system of the vehicle C further waits for the period Tw before its transmission. As a result, the vehicle C starts charging at the timing t8 in which the transmission of the vehicle A has been completed.

As shown above, in cases where more than three vehicles are moving close together, it becomes possible to avoid trouble in communication that a receiver in the vehicles cannot receive response frames due to the charging wave from other receivers.

Besides, original intervals among transmission timings in every vehicle A-C may be time Ta. Therefore, once a timing at which charging is started is delayed, the following timings (ex. timings t3, t5, t9) of charging do not collide overlap one another.

Second Embodiment

The second embodiment is different from the first embodiment in that it executes processes for acquiring transmission priority, in addition to the processes in the first embodiment.

Figure 7:
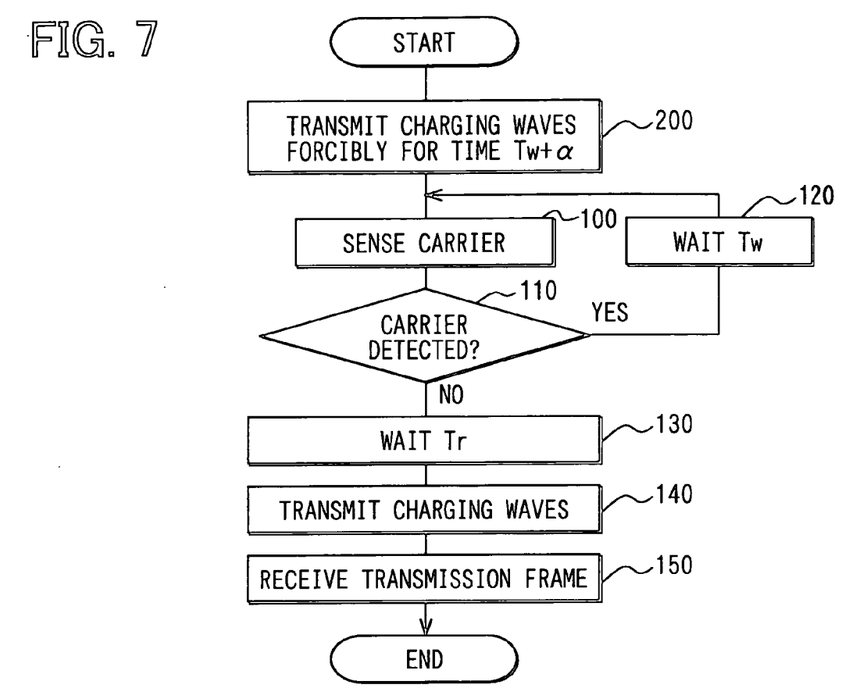
FIG. 7 shows a flowchart of process which the receiver of the embodiment execute to acquire priority.

FIG. 7 shows a flowchart of processes which the controller 32b of the second embodiment executes to acquire priority. The controller 32b executes these processes triggered by timer interruption, when the receiver 3 could not receive a response frame during a second predetermined period. The second predetermined period is set to be a period which should not become more longer to be effective as an interval between subsequent detections of tire air pressure. Thus, these processes are additional to the basic processes shown in FIG. 3, provided that the basic processes are executed on regular basis. For example, the second predetermined period is ten times as long as an original interval among transmission timings of the tire air pressure detecting system.

As shown in FIG. 7, in the additional processes, the controller 32b executes step 200 before executing step 100 which is the same as that of step 100 in FIG. 3. At step 200, the controller 32b keeps transmitting a charging wave for predetermined time Tw+α in order to acquire priority. For example, the time α is smaller than the time Tw.

In the first embodiment, the start timings of charging between the two vehicles are not coordinated each other. In the worst case, one of the two vehicles possibly acquires priority every time and the other vehicle keeps waiting. In this case, the receiver 3 cannot receive a response frame for a long period. This may cause the degradation in the ratio of reception for parameters related to tire air pressure in executing the processes in the first embodiment.

At step 200 the controller 32b keeps transmitting a charging wave forcibly for the predetermined time Tw+α. The transmission forces the other vehicle to wait for the predetermined time Tw before charging. Therefore, by executing the following steps 100-150 while the other vehicle is waiting, the receiver 3 can receive a response frame with certainty.

As describe above, according to the second embodiment, the processes for acquiring priority avoids a case in which only one of two vehicles always transmits a charging wave and response frames while the other one cannot. Thus, the processes in the second embodiments do not cause the degradation in the ratio of reception for parameters related to tire air pressure.

The present invention should not be limited to the embodiment discussed above and shown in the figures, but may be implemented in various ways without departing from the spirit of the invention.

For example, in the above embodiments, the receiver 3 waits for the first predetermined time Tw. However, the receiver 3 may wait for a time longer than the first predetermined time Tw, though waiting for the first predetermined time Tw will reduce intervals among timings of detection of tire air pressure.

Additionally, the antennas 31 may be replaced by an antenna commonly used for all the transmitters 2.

Further, the sensing unit 21 may be constructed to detect other tire conditions such as tire air temperature other than the tire air pressure.

What is claimed is:

1. A tire condition detecting system for a vehicle comprising:
a transmitter installed in a vehicle wheel having a tire, the transmitter including:
a first transmitting/receiving unit for receiving an electrical wave for electrical charging and transmitting signals;
a charging unit for supplying electrical power by means of the received electrical wave;

a sensing unit for outputting a detection signal related to air pressure of the tire; and a first controller, driven by the electrical power from the charging unit, for processing the detection signal and making the first transmitting/receiving unit transmit the detection signal; and a receiver installed in a chassis of the vehicle, including:

a second transmitting/receiving unit for receiving the detection signal transmitted from the transmitter and transmitting the electrical wave; and a second controller for making the second transmitting/receiving unit transmit the electrical wave for electrical charging and for determining the pressure of the tire according to the detection signal, wherein the second controller determines a transmission timing at which the second transmitting/receiving unit transmits the electrical wave to the transmitter, detects an electrical wave for electrical charging from another vehicle at the transmission timing, and waits for a first predetermined period before making the second transmitting/receiving unit transmit the electrical wave on detection of the electric wave from the another vehicle.

2. The tire condition detecting system according to claim 1, wherein the first predetermined period is a sum of time Tmax and time Tr, wherein the time Tmax is a period to take for the charging unit to store electrical power for transmission of the detection signal by the first transmitting/receiving unit, and the time Tr is a period of transmission of the detection signal by the first transmitting/receiving unit.

3. The tire condition detecting system according to claim 1, wherein the second controller waits for a time Tr before making the second transmitting/receiving unit transmit the electrical wave, if the intensity of the detected electrical wave from the another vehicle is smaller than a predetermined threshold, wherein the time Tr is a period of transmission of the detection signal by the first transmitting/receiving unit.

4. The tire condition detecting system according to claim 1, wherein the second controller makes the second transmitting/receiving unit keep transmitting the electrical wave for a time $Tw+\alpha$ longer than the first predetermined period Tw, if the second transmitting/receiving unit has not receive a detection signal for a second predetermined period.

5. A tire condition detecting method for a vehicle comprising steps of:

transmitting an electrical power wave from a chassis-side device installed on a chassis of the vehicle to a tire-side device as electric power to operate the tire-side device;

storing the electric power of the electrical wave in the tire-side device;

transmitting a response wave from the tire-side device to the chassis-side device with the electric power stored in the tire-side device, the response wave being smaller in electric power than the electrical power wave and indicative of a tire condition detected by the tire-side device, wherein the step of transmitting an electrical wave includes steps of checking whether the chassis-side device is receiving an another electrical power wave from another vehicle, and delaying a transmission of the electrical power wave of the chassis-side device when the step of checking determines that the chassis-side device is receiving the another electrical power wave, so that a transmission of the response wave of the tire-side device is transmitted when the chassis-side device is free from the another electrical power.

* * * * *